(12) United States Patent
Schukai et al.

(10) Patent No.: US 10,915,894 B2
(45) Date of Patent: Feb. 9, 2021

(54) SYSTEMS AND METHODS FOR DISTRIBUTED DATA MAPPING

(71) Applicant: REFINITIV US ORGANIZATION LLC, New York, NY (US)

(72) Inventors: Robert Joseph Schukai, Marietta, GA (US); David Costa Faidella, Sidcup (GB); Marco Pierleoni, Chelmsford (GB); Scott Ryan Manuel, Durham, NC (US)

(73) Assignee: REFINITIV US ORGANIZATION LLC, New York, NY (US)

( * ) Notice: Subject to any disclaimer, the term of this patent is extended or adjusted under 35 U.S.C. 154(b) by 293 days.

(21) Appl. No.: 15/922,505

(22) Filed: Mar. 15, 2018

(65) Prior Publication Data

US 2018/0315044 A1 Nov. 1, 2018

Related U.S. Application Data

(60) Provisional application No. 62/490,818, filed on Apr. 27, 2017, provisional application No. 62/506,090, filed on May 15, 2017.

(51) Int. Cl.
*G06Q 20/38* (2012.01)
*G06F 21/60* (2013.01)
(Continued)

(52) U.S. Cl.
CPC ........... *G06Q 20/382* (2013.01); *G06F 21/10* (2013.01); *G06F 21/602* (2013.01);
(Continued)

(58) Field of Classification Search
CPC .. G06Q 20/382; G06Q 2220/10; G06F 21/10; G06F 21/602; G06F 21/78
(Continued)

(56) References Cited

U.S. PATENT DOCUMENTS 6,260,059 B1 7/2001 Ueno et al.
6,618,751 B1 9/2003 Challenger et al.
(Continued)

FOREIGN PATENT DOCUMENTS

JP 4581200 B2 11/2010
KR 20160022978 A 3/2016

OTHER PUBLICATIONS

Kapusta et al., "Data protection by means of fragmentation in distributed storage systems", doi: 10.1109/NOTERE.2015. 7293486, 2015, pp. 1-8. (Year: 2015).*
(Continued)

*Primary Examiner* — Peter C Shaw
(74) *Attorney, Agent, or Firm* — Norton Rose Fulbright US LLP

(57) ABSTRACT

A method for conducting a transaction may include: receiving, at a user device from a transaction system, a request for a data element for conducting the transaction; in response to receiving the request, determining a data map corresponding to the requested data element, the data map including containing a plurality of pointers, each pointing to a respective one of a plurality of data fragments located on a respective one of a plurality of different data storage locations, such as a plurality of different data storage systems; retrieving, using the data map, the plurality of data fragments from the plurality of data storage locations; assembling the data element using the retrieved data fragments; and providing, by the user device to the transaction system, the data element to conduct the transaction. A method for processing the data map may include: fragmenting the data element into the plurality of data fragments; storing the plurality of data fragments at the plurality of data storage locations; generating the data map; and storing the data map separate from the plurality of data storage locations.

25 Claims, 8 Drawing Sheets

(51) Int. Cl.
*G06F 21/10* (2013.01)
*G06F 21/78* (2013.01)
*G06F 21/62* (2013.01)
*G06Q 20/32* (2012.01)

(52) U.S. Cl.
CPC ........ *G06F 21/6218* (2013.01); *G06F 21/78* (2013.01); *G06Q 20/3226* (2013.01); *G06Q 20/3823* (2013.01); *G06Q 20/3825* (2013.01); *G06Q 20/3827* (2013.01); *G06Q 2220/10* (2013.01)

(58) Field of Classification Search
USPC .......................................................... 726/26
See application file for complete search history.

(56) References Cited

U.S. PATENT DOCUMENTS

| | | | |
|---|---|---|---|
| 7,107,281 | B2 | 9/2006 | De La Huerga |
| 8,468,244 | B2 | 6/2013 | Redlich et al. |
| 8,782,236 | B1 | 7/2014 | Marshall et al. |
| 2003/0028493 | A1* | 2/2003 | Tajima .............. G06Q 20/3674 705/67 |
| 2006/0045270 | A1 | 3/2006 | Cohen |
| 2007/0214220 | A1* | 9/2007 | Alsop .................... H04L 51/12 709/206 |
| 2007/0245144 | A1 | 10/2007 | Wilson |
| 2010/0088389 | A1* | 4/2010 | Buller ................ G06F 11/1464 709/216 |
| 2011/0041172 | A1 | 2/2011 | Dennis et al. |
| 2012/0066517 | A1 | 3/2012 | Vysogorets et al. |
| 2013/0227110 | A1 | 9/2013 | Bacher |
| 2013/0275386 | A1* | 10/2013 | Shin .................... G06F 11/1458 707/667 |
| 2013/0282580 | A1 | 10/2013 | O'Brien et al. |
| 2015/0222704 | A1 | 8/2015 | Kipp et al. |
| 2015/0294118 | A1 | 10/2015 | Parker et al. |
| 2015/0304444 | A1* | 10/2015 | Lundborg ........... G06F 16/2272 709/213 |
| 2016/0034896 | A1 | 2/2016 | O'Brien et al. |
| 2016/0071099 | A1 | 3/2016 | Lazay |
| 2016/0239683 | A1 | 8/2016 | Gujral et al. |
| 2017/0277774 | A1* | 9/2017 | Eigner ............... G06Q 30/0269 |

OTHER PUBLICATIONS

Bai et al., "Design of a Reliable Distributed Secure Database System", doi: 10.1109/NAS.2010.61, 2010, pp. 91-99. (Year: 2010).*

International Search Report and Written Opinion dated May 10, 2018, of the corresponding International Application PCT/US2018/022677 filed Mar. 15, 2018, 14 pages.

International Search Report and Written Opinion dated Oct. 3, 2018, of the corresponding International Application PCT/US2018/037365 filed Jun. 13, 2018, 10 pages.

Paci F et al: "An Interoperable Approach to Multifactor Identity Verification", Computer, IEEE Computer Society, USA, vol. 42, No. 5, May 1, 2009 (May 1, 2009), pp. 50-57, XP011262152, ISSN: 0018-9162. 8 pages.

Supplementary EP Search Report dated May 4, 2020, of the corresponding EP application EP18792051, 8 pages.

* cited by examiner

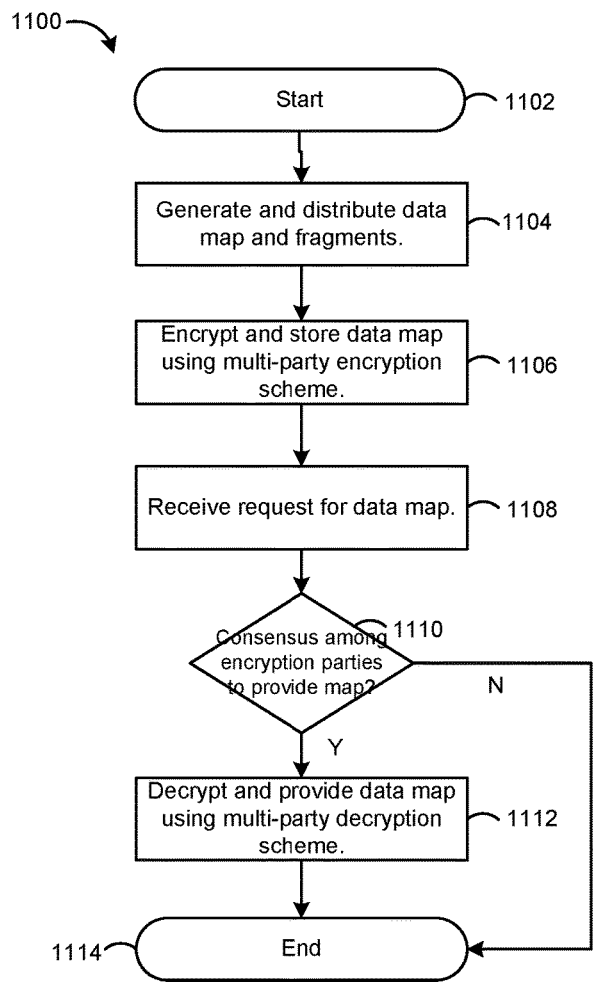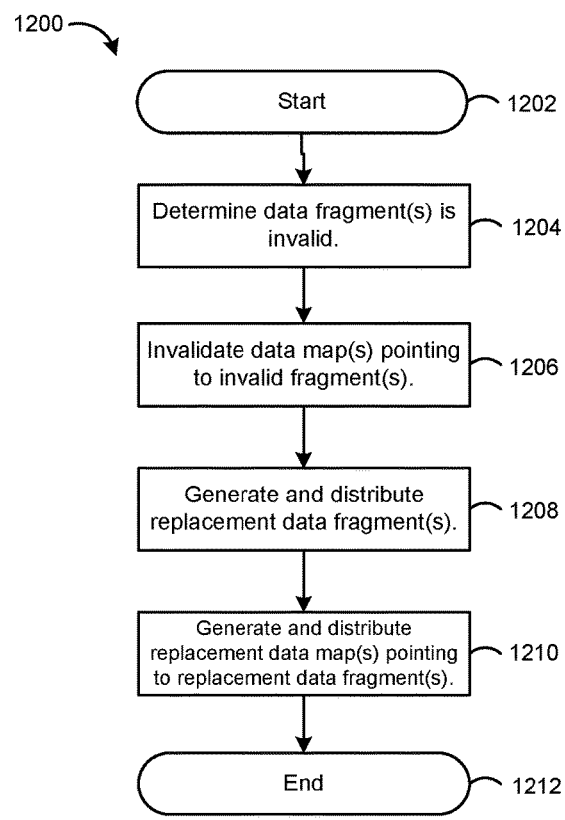
FIG. 11
FIG. 12

SYSTEMS AND METHODS FOR DISTRIBUTED DATA MAPPING

CROSS REFERENCE TO RELATED APPLICATIONS

This application claims priority to U.S. Provisional Patent Application No. 62/490,818, filed on Apr. 27, 2017, and U.S. Provisional Patent Application No. 62/506,090, filed on May 15, 2017, which are each hereby incorporated by reference herein in their entireties.

BACKGROUND INFORMATION

Increasingly, people store and rely upon sensitive data to conduct transactions. This data can include identify information, such as names, addresses, telephone numbers, state identification numbers, etc.; financial information, such as bank account numbers, account balances, transaction identifiers, etc.; and various other items of data that may be regarded as sensitive in various contexts. Transactions that may rely on such data are myriad, and can include purchase transactions, credit applications, account creation transactions, identify verifications, security interrogations, employment applications, etc.

The effectiveness of transactions relying on sensitive data to function according to their intended purposes depends upon the secure storage and access of this data. The consequences of sensitive data falling into the wrong hands can be severe. For example, when an individual's identity data is stolen, a criminal entity may use the data to impersonate the individual to conduct transactions, open accounts, etc. The process of recovering from identity theft, such as by restoring funds, establishing new identity credentials, and clearing a credit record, etc., may be arduous, and take months or even years.

Secure access and storage of data has traditionally been achieved using technologies such as encryption. However, technologically adept entities are increasingly able to bypass even the most secure encryption techniques.

Thus, a need exists for systems and methods to provide improved security for storage and access to data for conducting transactions and other purposes.

BRIEF DESCRIPTION OF THE DRAWINGS

So that the features of the present invention can be understood, a number of drawings are described below. However, the appended drawings illustrate only particular embodiments of the invention and are therefore not to be considered limiting of its scope, for the invention may encompass other equally effective embodiments.

FIG. 11 is a flowchart depicting an embodiment of a method of providing access to a data map.

FIG. 12 is a flowchart depicting an embodiment of a method of refreshing data stored according to the distributed data architecture.

DETAILED DESCRIPTION OF EXAMPLE EMBODIMENTS

Figure 1:
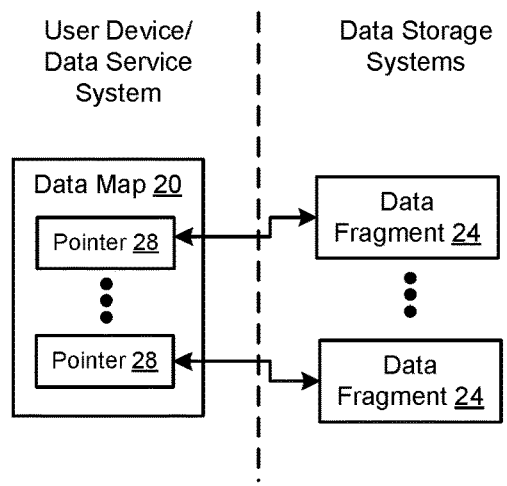
FIG. 1 is a schematic diagram depicting an embodiment of a distributed data architecture.

FIG. 1 depicts an embodiment of a distributed data architecture providing improved security for storage of and access to at least one data element. The distributed data architecture includes a data map 20 stored on a first system, such as a user device or data service system, and a plurality of fragments 24 of the at least one data element stored at a plurality of different storage locations on one or more second systems separate from the first system. For each data element stored by the distributed data architecture, the data map 20 includes a plurality of pointers 28 pointing to the plurality of the data fragments 24 making up the data element.

Storing and/or accessing the data element may include a two stage process. In a first stage, or set of steps, the data map 20 is created, stored and/or accessed to create, store and/or access the pointers 28 identifying the locations of the data fragments 24 making up the data element. In a second stage, or set of steps, the plurality of the data fragments 24 are created, stored and/or accessed to create, store and/or access the data element. Both the data map 20 and/or first system, on the one hand, and the data fragments 24 and/or second system(s), on the other hand, provide security measures including, e.g., encryption, access policies, etc. Additionally, the first and second systems may be separate computing systems, the second system(s) may be located remotely from the first system, and the plurality of different storage locations may each be on separate second systems, be on separate devices, or require separate access transactions.

The distributed data architecture thus provides improved security for storage of and access to data elements. The distributed, multi-tiered structure of the data architecture, including the data map 20 as a first tier, and the data fragments 24 constituting the data elements as a second tier distributed remotely from the first tier, provides improved security by limiting the damage that may be immediately done by an improper breach of the system, as such a breach likely results only initially in access of the first tier, enabling further protection of the actual data elements, which must be accessed through both the first and second tiers. Moreover, to breach both tiers of the distributed data architecture, one must potentially breach a plurality of different data security systems, including, e.g., the encryption, etc. of the data map 20 and first system on the one hand, and the encryption, etc. of the data fragments 24 and second system(s) on the other hand, before the data elements may be accessed.

Figure 2:
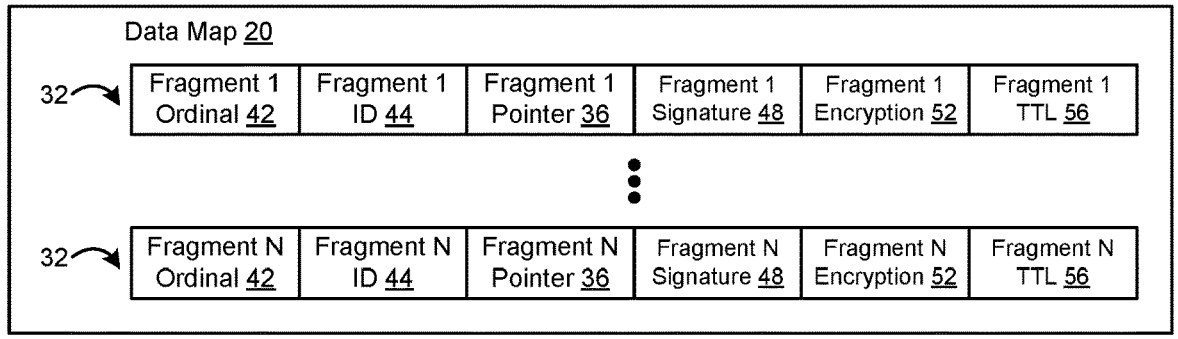
FIG. 2 is a schematic diagram depicting an embodiment of a data map of the distributed data architecture.

FIG. 2 depicts an embodiment of a data map 20, including a plurality of map elements 32 for each data element stored according to the distributed data structure. Each map element 32 corresponds to a different respective data fragment 24 of the data element, and includes a pointer data field 36 and optionally one or more additional data fields. The pointer data field 36 includes a pointer 28 to the location of the data fragment 24 corresponding to that map element 32 on a corresponding second system. The pointer 28 may take a variety of different forms, such as an Internet address, an FTP address, a web address, etc.

The additional data fields may include one or more of a fragment order field 42, a fragment identifier field 44, a fragment signature field 48, a fragment encryption field 52, or a fragment time-to-live field 56. The fragment order field 42 includes an order number of the fragment within the fragments 24 of the data element, for use in ordering the fragments 24 to reconstruct the data element. The fragment identifier field 44 includes an identifier uniquely identifying the fragment 24, such as a hash of a payload of the fragment 24. The fragment signature field 48 includes a cryptographic signature of the entire data fragment 24, such as for use in validating a fragment 24 upon retrieval to verify that it has not been altered. The fragment encryption field 52 includes information about the encryption scheme used to encrypt the fragment 24, such as for use in decrypting the fragment 24. The time-to-live field 56 includes a time-to-live attribute of the data fragment 24, such as indicating a time period for which the data fragment 24 is valid In embodiments, a data map may include only any subset of, or an alternative connection or ordering of, the features depicted in or discussed herein in regard to FIG. 2.

Figure 3:
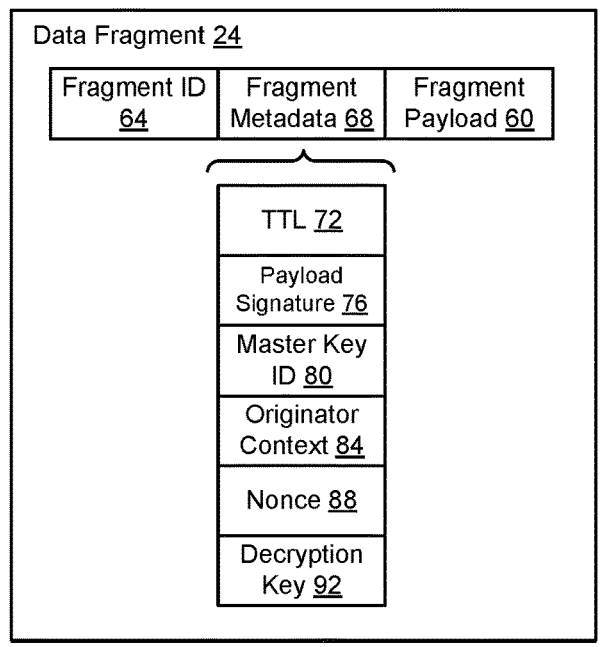
FIG. 3 is a schematic diagram depicting an embodiment of a data fragment of the distributed data architecture.

FIG. 3 depicts an embodiment of a data fragment 24. The depicted fragment 24 includes a fragment payload field 60 and optionally one or more additional data fields. The fragment payload field 60 includes the fragment of the data element. The fragment may be stored in the fragment payload field 60 in an encrypted form.

The depicted additional fields include a fragment identifier field 64 and fragment metadata fields 68. The fragment identifier field 64 includes the unique identifier of the data fragment 24. The depicted metadata fields 68 include a time-to-live field 72, a payload signature field 76, a master key identifier field 80, an originator context field 84, a nonce field 88, and a decryption key field 92. The time-to-live field 72 includes the time-to-live attribute of the data fragment 24. The payload signature field 76 includes a cryptographic signature of the payload field 60, such as for use in validating the payload upon retrieval to verify that it has not been altered. The master key identifier field 80 includes a unique identifier of the master key used to encrypt a fragment decryption key, such as for use, along with the nonce field 88, to generate a unique encryption key per fragment 24. The originator context field 84 includes any relevant information about the issuer of the fragment 24. The nonce field 88 includes a nonce value, such as may be used to randomize an encryption key used to encrypt the fragment decryption key. The fragment decryption key field 92 includes a randomized encryption key that can decrypt the fragment 24, encrypted with the master key.

In embodiments, a data fragment may include only any subset of, or an alternative connection or ordering of, the features depicted in or discussed herein in regard to FIG. 3.

Figure 4:
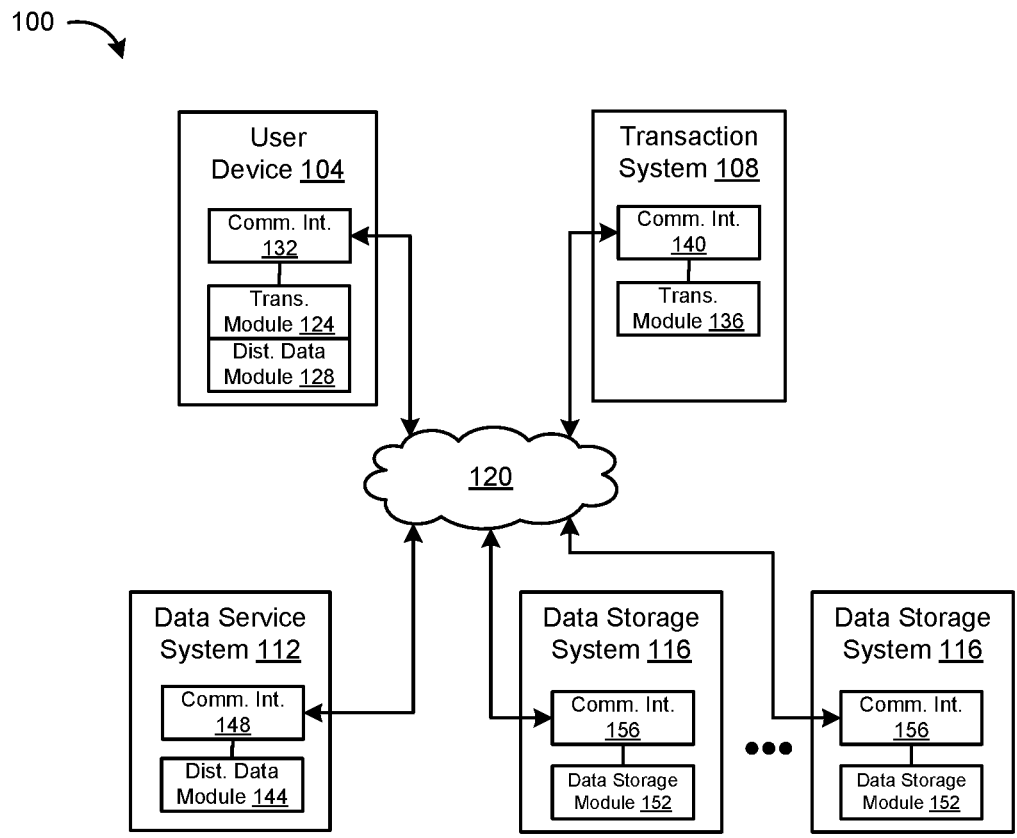
FIG. 4 is a schematic diagram depicting an embodiment of system for conducting a transaction, and processing data, according to the distributed data architecture.

FIG. 4 depicts an embodiment of a system 100 for conducting a transaction using the distributed data architecture. The depicted system 100 includes a user device 104, a transaction system 108, a data service system 112, one or more data storage systems 116, and one or more communication networks 120.

The user device 104 is used by a user to communicate with the transaction system 108 via one or more communication networks 120 to conduct a transaction with the transaction system 108. The user device 104 includes a transaction module 124, a distributed data module 128, and a communication interface 132. The transaction module 124 communicates, using the communication interface module 132 via the one or more communication networks 120, with the transaction system 108 to conduct the transaction. The distributed data module 128 communicates, using the communication interface module 132 via the one or more communication networks 120, with the data service system 112 and/or data storage systems 116 to retrieve data elements according to the distributed data architecture, for provision, such as via the transaction module 124, to the transaction system 108 for conducting the transaction.

The transaction system 108 is a system used by a person or organization to conduct the transaction with the user. The transaction system 108 includes a transaction module 136 and a communication interface module 140. The transaction module 136 communicates, using the communication interface module 140 via the one or more communication networks 120, with the user device 104, data service system 112 and/or data storage systems 116 to conduct the transaction.

The data service system 112 is a system providing data services to the user device 104 via one or more communication networks 120 to enable conducting the transaction with the transaction system 108 using the distributed data architecture. The data service system 112 includes a distributed data module 144 and a communication interface module 148. The distributed data module communicates 144, using the communication interface module 148 via the one or more communication networks 120, with the user device 104 and/or data storage systems 116 to provide data services according to the distributed data architecture.

The data storage systems 116 store and provide access via one or more communication networks 120 to the data fragments of the distributed data architecture. The data storage systems 116 each include a data storage module 152 and a communication interface 156. The data storage module 152 stores and provides selective access for the user device 104 and/or data service system 112, using the communication module 156 via the one or more communication networks 120, to one or more data fragments of the distributed data architecture.

In embodiments, the plurality of different storage locations at which the plurality of data fragments 24 are stored may include locations at a corresponding plurality of different data storage systems 116. For example, each of the plurality of the data fragments 24 may be stored using a respective different one of a plurality of the data storage systems 116. In such embodiments, each data storage system 116 may be implemented using a separate computing system.

In embodiments, the plurality of different data storage locations at which the plurality of data fragments 24 are stored may include locations at a corresponding plurality of different data storage devices. For example, each of the data fragments 24 may be stored using a respective different one of a plurality of different data storage devices. The data storage devices may include hard drives, flash memories, etc. In such embodiments, a plurality of the different data storage devices may be part of a single data storage system 116 (for example, the data storage module 152 may include a plurality of different data storage devices), part of a plurality of different data storage systems 116 (for example, a plurality of data storage systems 116 may each include a data storage module 152 including a respective one of the plurality of data storage devices), or combinations thereof.

In embodiments, the plurality of different data storage locations at which the plurality of data fragments 24 are stored may include multiple locations on a single data storage system 116 or device. For example, each of the data fragments may be stored at different data storage locations on a single data storage system 116 or device. In such embodiments, each of the plurality of different data storage locations may require a separate storage and/or access transaction, or set of steps, to store and/or access data at that data storage location. In one example, the plurality of different data storage locations may be within a plurality of different partitions of, or behind other logical or physical boundaries within, the data storage system 116 or device that would require such separate transactions or sets of steps.

The one or more communication networks 120 may include one or more of the Internet, a cellular network, a wireless local area network (e.g., WiFi), etc.

The transaction may include one or more of: a security transaction, in which the user provides identity data to prove his or her identity to the transaction system 108; a financial transaction, in which the user conducts a financial transaction, such as purchasing an item, making a payment, exchanging currency, etc.; other types of transactions in which the user provides some type of data regarded as sensitive to the transaction system 108; or variations and/or combinations of these types of transactions.

Embodiments of the user device 104, transaction system 108, data service system 112, data storage systems 116, and/or any individual one, subset, or all of the components thereof, such as the communication interfaces, transaction modules, distributed data modules, data storage modules, etc., may be implemented as hardware, software, or a mixture of hardware and software. For example, each of the user device, transaction system, data service system, data storage systems, and/or any individual one, subset, or all of the components thereof, may be implemented using a processor and a non-transitory storage medium, where the non-transitory machine-readable storage medium includes program instructions that when executed by the processor perform embodiments of the functions of such components discussed herein. In exemplary embodiments, each of the user device, transaction system, data service system, data storage systems, and/or any individual one, subset, or all of the components thereof, may be implemented using one or more computer systems, such as, e.g., a mobile computing device, a desktop computer, laptop computer, network device, server, Internet server, cloud server, etc.

In embodiments, a system for conducting a transaction using the distributed data architecture may include only any subset of, or an alternative connection or ordering of, the features depicted in or discussed herein in regard to FIG. 4.

Figure 5:
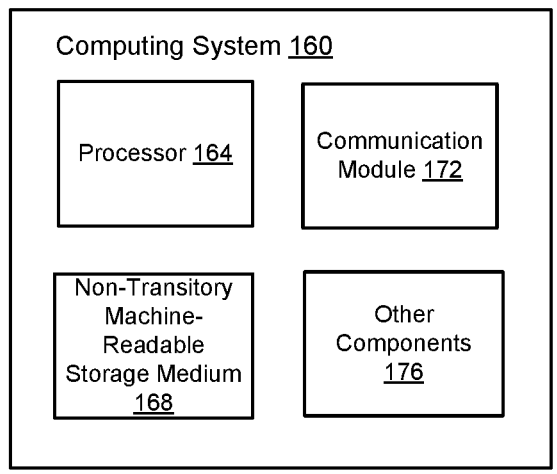
FIG. 5 is a schematic diagram depicting an embodiment of a computing system for implementing components of the system for conducting a transaction and processing data.

FIG. 5 depicts an embodiment of a computer system 160 that may be used to implement the user device 104, transaction system 108, data service system 112, data storage systems 116, and/or any individual one, subset, or all of the components thereof. The computer system 160 includes a processor 164, a non-transitory machine-readable storage medium 168, a communication circuit 172, and optionally other components 176. The processor 164 executes program instructions stored in the non-transitory machine-readable storage medium 168 to perform the functionality of the component it is implementing as discussed herein. The communication circuit 172 can be controlled by the processor 164 to communicate with other devices, such as the user device 104, transaction system 108, data service system 112 and/or data storage systems 116, to perform the functionality of the component it is implementing as discussed herein. The optional other components 176 may include any further components required by the computer system 160 to perform this functionality.

In embodiments, a computer system that may be used to implement the user device, transaction system, data service system, data storage systems, and/or any individual one, subset, or all of the components thereof may include only any subset of, or an alternative connection or ordering of, the features depicted in or discussed herein in regard to FIG. 5.

Figure 6:
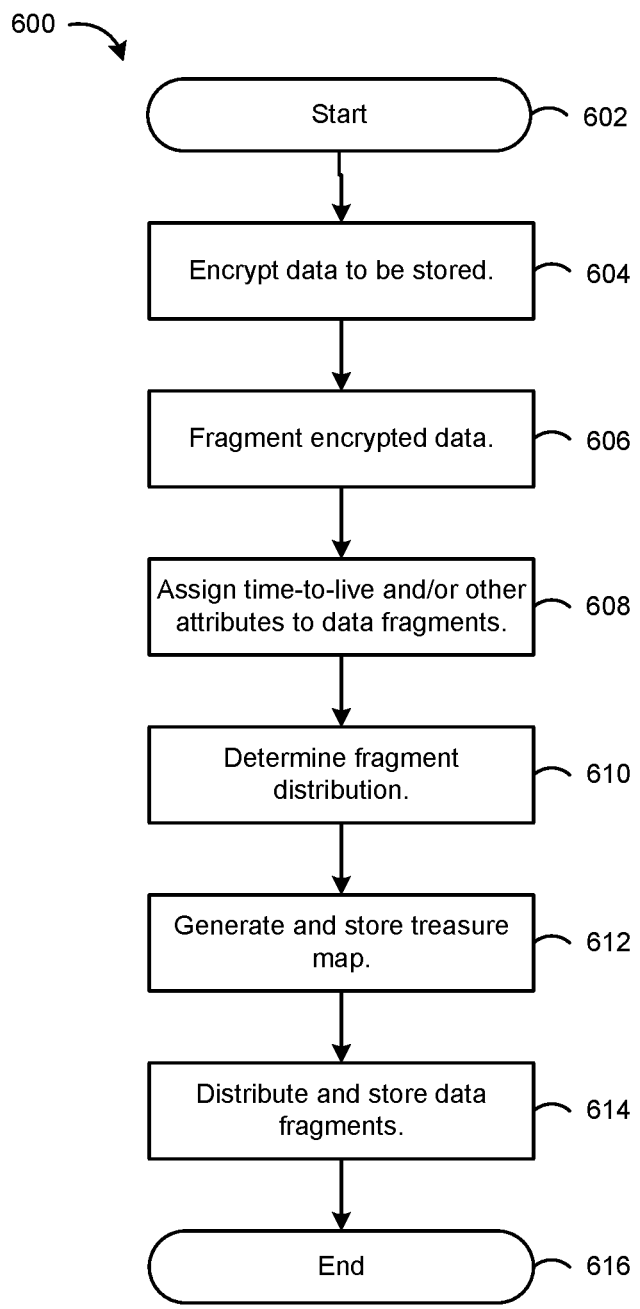
FIG. 6 is a flowchart depicting an embodiment of a method of processing data according to the distributed data architecture.

FIG. 6 depicts an embodiment of a method 600 of processing and storing data according to the distributed data architecture to enable use of the data in conducting transactions according to the distributed data architecture. The method provides the improved security of the distributed data architecture for data stored according to the distributed data architecture. The method may be performed by or involving components of the system of FIG. 4, such as by the user device 104 and/or data service system 112. The method begins at step 602.

At step 604, data elements to be stored according to the distributed data architecture are encrypted. The data elements may be encrypted using various different encryption techniques. For example, the data element may be encrypted using one or more of an encryption standard, such as the Advanced Encryption Standard (AES), Rivest-Shamir-Adleman (RSA), etc.; a hashing standard, such as the Secure Hash Algorithm 2 (SHA-2), etc.; a digital signature, such as RSA, elliptic curve Digital Signature Algorithm (ECDSA), Digital Signature Standard (DSS), etc.; public key infrastructure (PKI); secret sharing algorithms, such as Shamir's Secret Sharing, etc.

At step 606, each encrypted data element is split apart into a plurality of separate data fragments 24. Each data fragment 24 is a different portion of the data element, and together, the plurality of data fragments 24 constitute the entire data element. The data element may be split using various different splitting techniques. For example, the data element may be split to create a plurality of data fragments 24 having contiguous portions of the original data element. Alternatively, the data element may be split into a plurality of sub-fragments, numbering a multiple of an eventual number of the plurality of data fragments 24, and then the subfragments combined to form the fragments 24, such as by combining interleaved slices of the data element, or by combining random slices of the data element, into each fragment 24. In another alternative, the data element may be split into a plurality of data fragments 24 or subfragments as part of an encryption process using a secret sharing algorithm such as Shamir's Secret Sharing.

In embodiments, the order of steps 604 and 606 may be reversed. That is, the data element may first be split into the plurality of fragments 24, and then each of the fragments 24 encrypted using the encryption techniques.

At step 608, time-to-live (TTL) attributes are assigned to each of the data fragments 24. The TTL attributes provide even further security for the distributed data architecture by controlling the time period for which the data fragments 24, and thus the data elements constituted by the data fragments 24, are valid and accessible. Controlling access to the data as a function of time further limits the potential for improper access to the data, as it prevents the presence of data from being forgotten and left in a potentially unsecure state by automatically invalidating and preventing access to the data once the selected lifetime of the data has expired. The TTL attribute may indicate the validity time period in a variety of ways. For example, the TTL attribute may include one or more of a time at which the validity of the fragment expires, a time at which the validity of the fragment begins, etc.

At step 610, a distribution of the plurality of encrypted fragments 24 among a plurality of separate data storage locations is determined. In embodiments, the plurality of different data storage locations may be at separate data storage systems 116, separate storage devices, or combinations thereof. The plurality of different data storage systems 116 or devices also may be located at physically separate locations, such as at separate storage facilities. Storing a plurality of data fragments 24 on a plurality of different data storage systems 116 or devices generally may require a separate data storage transaction or set of steps for each system 116 or device. In embodiments, the plurality of different data storage locations may include a plurality of different locations on a single data storage system 116 or device, where the plurality of different locations may each require a separate transaction or set of steps to store or access data at such location. The distribution may be determined in a variety of ways. For example, the distribution may be determined by distributing each fragment 24 to a different one of the plurality of separate data storage locations.

At step 612, a data map 20 including a map element 32 corresponding to each of the data fragments 24 is generated and stored. The data map 20 and constituent map elements 32 may take a variety of forms, such as, e.g., the form of the exemplary data map 20 and map elements 32 depicted in FIG. 2. Each map element 32 includes a field containing a pointer 28 to the location at the data storage system 116 on which the corresponding data fragment 24 is stored. The map elements 32 may include one more further fields containing further information, such as one or more of the TTL attribute and the other information discussed above in regard to FIG. 2. The generated data map 20 may be stored in various locations. For example, the data map 20 may be stored on the user device 104 or the data service system 112, according to various different embodiments, such as discussed further below in regard to FIGS. 8A-8D.

At step 614, the encrypted data fragments 24 are distributed to and stored at the plurality of separate data storage locations according to the determined distribution. The distribution and storage of each data fragment 24 at a corresponding one of the plurality of different data storage locations may include executing a corresponding separate transaction or set of steps to perform the distribution and storage. The method ends at step 616.

In embodiments, a method of a method of processing and storing data according to the distributed data architecture may include only any subset of, or an alternative ordering of, the features depicted in or discussed above in regard to FIG. 6.

Figure 7:
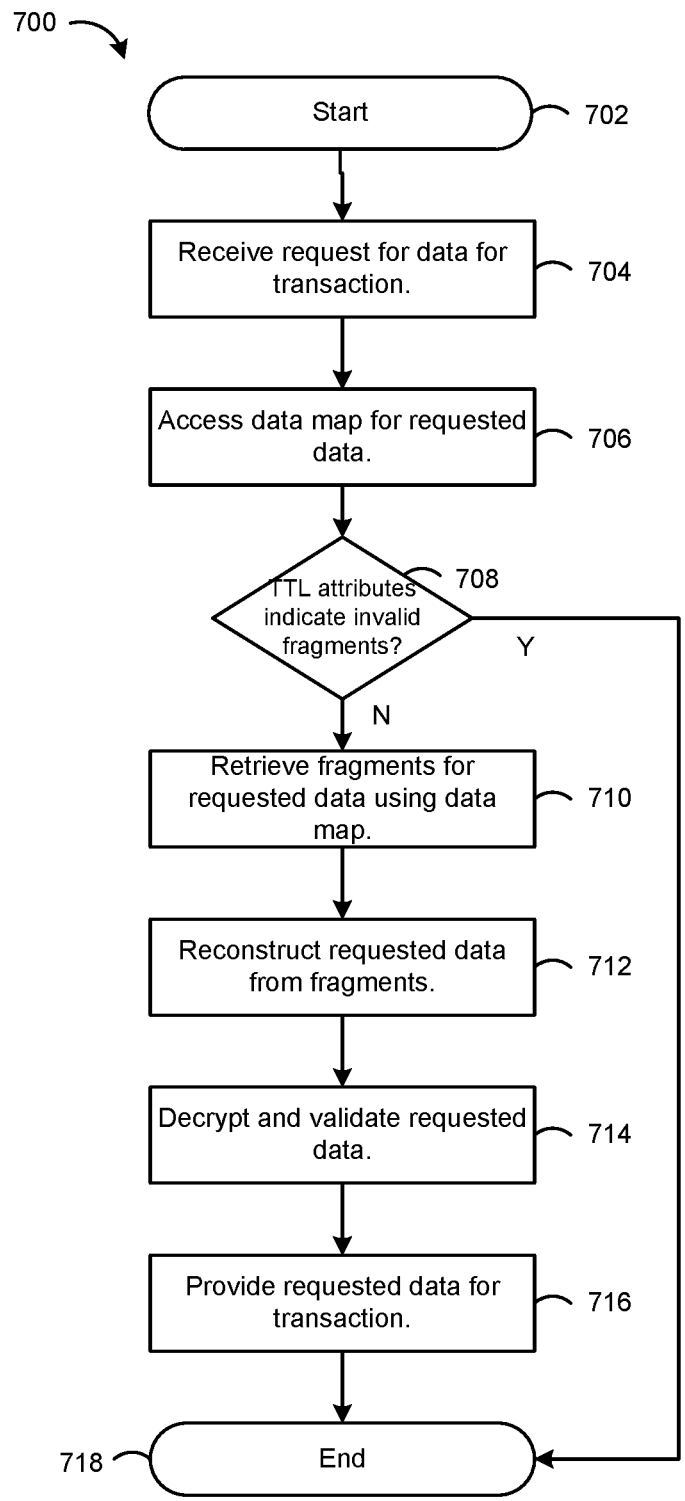
FIG. 7 is a flowchart depicting an embodiment of a method of conducting a transaction using data stored according to the distributed data architecture.

FIG. 7 depicts an embodiment of a method 700 of conducting a transaction using data stored according to the distributed data architecture. The method provides the improved security provided by the distributed data architecture for data involved in the transaction. The method may be performed by or involving components of the system of FIG. 4, such as by the user device 104 and/or data service system 112. The method begins at step 702.

At step 704, a request for one or more data elements for conducting a transaction is received. In embodiments in which a user uses the user device 104 to conduct a transaction with the transaction system 108, the request may be received by the user device 104 from the transaction system 108. For example, the user device 104 may be a mobile device, such as a smart phone, tablet, etc., and the transaction system 108 may be an Internet-based system, such as a website, application server, etc. Other types of user devices 104 and transaction systems 108 are also possible.

As discussed above, the transaction may include one or more of a variety of different types of transactions, such as a security authorization, a purchase transaction, a credit application, etc. The requested one or more data elements include data relevant to the transaction. For a security authorization or other identity verifying transaction, the requested data element may include identity data, such as one or more of a name of the user, an mailing address of the user, an email address of the user, a picture of the user, a driver's license number of the user, a passport number of the user, etc. For a purchase, credit application or other financial transaction, the requested data element may include financial data, such as one or more of a currency amount, an account number, a fund transfer authorization, etc. Other types of transactions may involve other types of data elements.

At step 706, a data map 20 corresponding to the requested data element is accessed to determine the pointers 28, TTL attributes, etc. for the data fragments 24 constituting the data element. The data map 20 may be accessed in a variety of ways. In embodiments, the data map 20 is accessed by the user device 104, while in other embodiments, the data map 20 is accessed by the data service system 112. In embodiments, an existing data map 20 is accessed, while in other embodiments, a data map 20 that is generated specifically for conducting the transaction in response to the data element request is accessed. Further details of such embodiments are discussed below in regard to FIGS. 8A-8D.

At step 708, the TTL attributes for the data fragments 24 constituting the requested data element in the data map 20 are examined to determine whether the data fragments 24 are all still currently valid. If the TTL attributes for all of the data fragments 24 constituting the data element indicate that the fragments 24 are currently valid, the method proceeds to step 710 to retrieve the fragments 24, etc. If the TTL attributes for any of the data fragments 24 constituting the data element indicate that fragments 24 are currently invalid, the method proceeds to step 718, where the method ends, to enforce the TTL expiration by preventing retrieval of the expired fragments 24. In embodiments, the examining and enforcing of the TTL attributed may be performed by the user device 104, while in other embodiments it may be performed by the data service system 112. The TTL attributes may be found in the TTL field 56 of the data map 20 and/or the TTL field 72 of the fragment metadata 68 of the fragment 24.

At step 710, the pointers 28 in the data map 20 for the data fragments 24 constituting the requested data element are used to retrieve the data fragments 24. The data fragments 24 may be retrieved in a variety of ways, such as via communication with the data storage system(s) 116 or device(s) containing the data fragments 24 over the one or more communication networks 120 according to data transfer protocols used by such system(s) 116 or device(s). The retrieval of each data fragment 24 from a corresponding one of the plurality of different data storage locations may include executing a corresponding separate transaction or set of steps to perform the retrieval. In embodiments, the retrieving of the data fragments 24 may be performed by the user device 104, while in other embodiments it may be performed by the data service system 112.

At step 712, the data element is reconstructed from the retrieved data fragments 24. In embodiments in which the data element was first encrypted and then fragmented, the data fragments 24 may be directly combined to reconstruct the encrypted data element. In embodiments in which the data element was first fragmented and then the fragments 24 encrypted, the retrieved data fragments 24 may first be decrypted and then combined to reconstruct the data element. The data fragments 24 may be combined to form the data element according to the recipe used to fragment the data element, such as creating contiguous, interleaved or randomized combinations of portions of the data element, which may be determined, e.g., from the map elements 32 corresponding to the data fragments, such as the fragment encryption field 52. In embodiments, the reconstruction of the data element from the retrieved data fragments 24 may be performed by the user device 104, while in other embodiments it may be performed by the data service system 112. In embodiments, prior to reconstruction, or as part of the reconstruction process, each of the retrieved data fragments 24 may be validated, such as using the fragment signature 48, in order to protect against malicious manipulation of the fragments 24 by other parties.

At step 714, the reconstructed data element is decrypted and validated. The data element may be decrypted according to the encryption used to encrypt the data element, which may be determined from the map elements corresponding to the data fragments 24, such as the fragment encryption field 52, and fragment metadata 68. In embodiments in which the data element was first fragmented and then the fragments 24 encrypted, and the retrieved data fragments 24 are decrypted and then combined to reconstruct the data element, the data element may simply be validated, or decrypted and validated if further encryption is still present on the reconstructed data element.

At step 716, the requested data element is provided for conducting the transaction. In embodiments in which a user uses the user device 104 to conduct a transaction with the transaction system 108, the requested data element may be provided by the user device 104 to the transaction system 108. The data element may be encrypted as part of a communication protocol between the user device 104 and the transaction system 108. As a result of providing the data element, the transaction may be performed to completion.

In embodiments, a method of a conducting a transaction using data stored according to the distributed data architecture may include only any subset of, or an alternative ordering of, the features depicted in or discussed above in regard to FIG. 7.

As discussed above, accessing the data map 20, retrieving the data fragments 24, and/or reconstructing the data element may selectively be performed by the user device 104, the data service system 112, or the transaction system 108. FIG. 8A-8D depict embodiments of the method of conducting a transaction of FIG. 7, showing further details with respect to the flow of data between devices during the method.

Figure 8A:
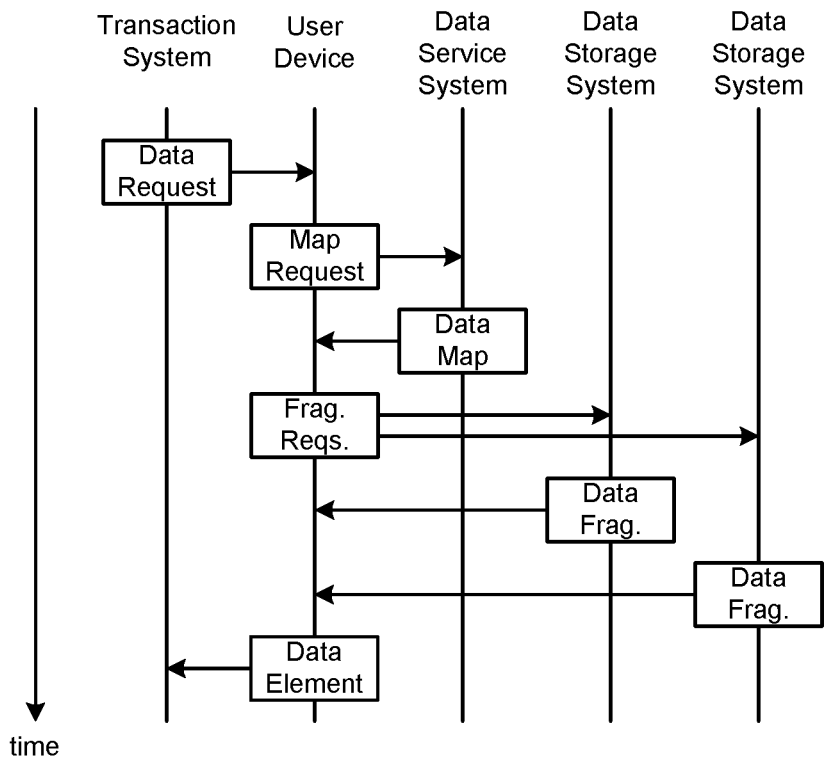
FIG. 8A is a data flow diagram depicting an embodiment of data flows during the method of conducting a transaction using data stored according to the distributed data architecture.

In FIG. 8A, the user device 104 receives the request for the data element from the transaction system 108, then requests the data map from the data service system 112. The data service system 112 may either retrieve an existing data map 20 in its possession, or generate a new data map 20 specifically for the transaction. Storing or generating the data map 20 on the data service system 112 may provide further benefits of the distributed data architecture by limiting the degree of exposure of exposure of the data map 20 to the user device 104, which may involve greater security risks than the data service system 112. Generating a data map 20 specifically for a transaction may also provide further benefits of the distributed data architecture by limiting the degree of exposure of the data map 20 to even the data service system 112, which may even itself entail security risks. Moreover, generating a data map 20 specifically for a transaction may also provide even further benefits of the distributed data architecture by tailoring the content of the data map 20 to the transaction, and thereby not pointing to, and thus not exposing to risk, data in the data map 20 unnecessary for the transaction.

Returning to FIG. 8A, the data service system 112 provides the data map 20 to the user device 104, which then uses the data map 20 to request the data fragments 24 corresponding to the requested data element from the data storage systems 116. Upon receiving the data fragments 24 from the data storage systems 116, the user device 104 reconstructs the data element, and provides the data element to the transaction system 108. Note that in FIGS. 8A-8D, although two data fragments 24 and two data storage systems 116 are shown, the number of the plurality of data fragments 24 and the one or more data storage systems 116 may vary in various different embodiments.

Figure 8B:
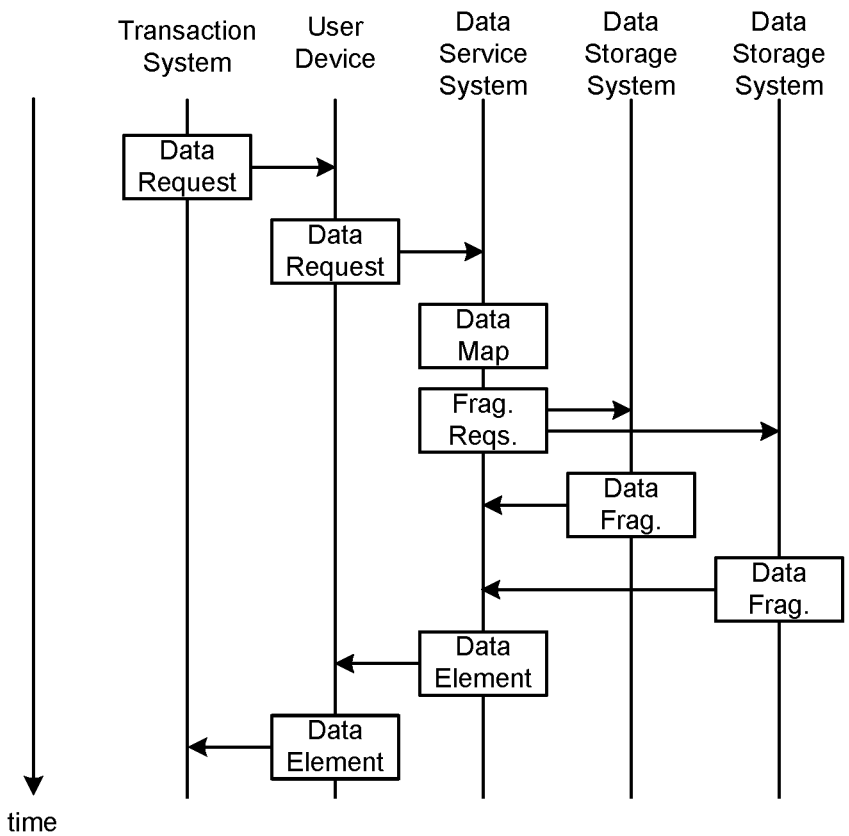
FIG. 8B is a data flow diagram depicting another embodiment of data flows during the method of conducting a transaction using data stored according to the distributed data architecture.

In FIG. 8B, the user device 104 again receives the request for the data element from the transaction system 108, but then requests the data element from the data service system 112. The data service system 112 then either retrieves an existing data map 20 in its possession or generates a new data map 20 specifically for the transaction. The data service system 112 then uses the data map 20 to request the data fragments 24 corresponding to the requested data element from the data storage systems 116. Upon receiving the data fragments 24 from the data storage systems 116, the data service system 112 reconstructs the data element, and provides the reconstructed data element to the user device 104, which provides it to the transaction system 108. Such an embodiment may provide the benefit of locating many of the manipulations of the distributed data architecture on the potentially more secure data service system 112 instead of the user device 104.

Figure 8C:
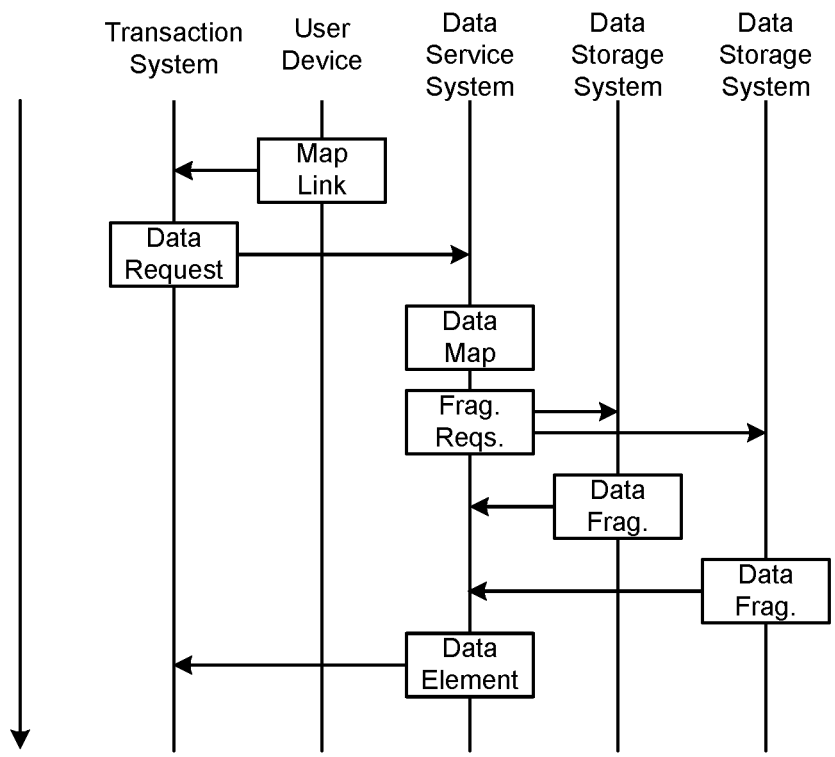
FIG. 8C is a data flow diagram depicting another embodiment of data flows during the method of conducting a transaction using data stored according to the distributed data architecture.

In FIG. 8C, during the transaction the user device 104 provides a link to the data service system 112 to the transaction system 108, such as in response to a request for a data element or other aspect of the transaction. The data service system 112 then receives the request for the data element from the transaction system 108. The data service system 112 then either retrieves an existing data map 20 in its possession, or generates a new data map 20 specifically for the transaction. The data service system 112 then uses the data map 20 to request the data fragments 24 corresponding to the requested data element from the data storage systems 116. Upon receiving the data fragments 24 from the data storage systems 116, the data service system 112 reconstructs the data element, and provides the reconstructed data element to the transaction system 108. This embodiment also may provide the benefit of locating many of the manipulations of the distributed data architecture on the potentially more secure data service system 112 instead of the user device 104.

Figure 8D:
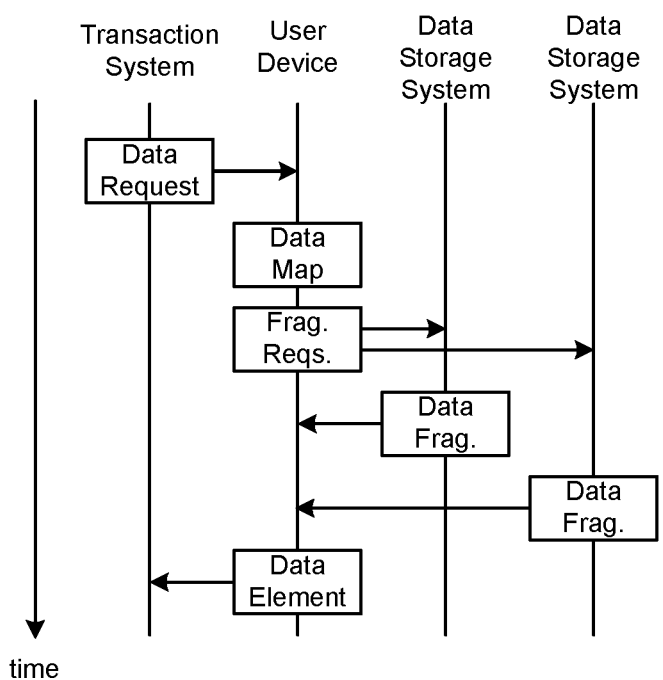
FIG. 8D is a data flow diagram depicting another embodiment of data flows during the method of conducting a transaction using data stored according to the distributed data architecture.

In FIG. 8D, the user device 104 receives the request for the data element from the transaction system 108, and then itself either retrieves an existing data map 20 in its possession or generates a new data 20 map specifically for the transaction. The user device 104 then uses the data map 20 to request the data fragments 24 corresponding to the requested data element from the data storage systems 116. Upon receiving the data fragments 24 from the data storage systems 116, the user device 104 reconstructs the data element, and provides the reconstructed data element to the transaction system 108. This embodiment may provide a benefit of a simplified system by eliminating the need for the data service system 112.

In embodiments, the retrieved data fragments 24 may be provided to the transaction system 108 instead of the reconstructed data element, with the transaction system 108 then reconstructing the data element from the data fragments 24. For example, the embodiments of FIGS. 8A-8D may be adapted to have the device that retrieves the data fragments, such as the user device 104 or data service system 112, forward the retrieved data fragments 24 to the transaction system 108, for reconstruction by the transaction system 108, instead of that device reconstructing the data element and forwarding the reconstructed data element to the transaction system 108.

Figure 9:
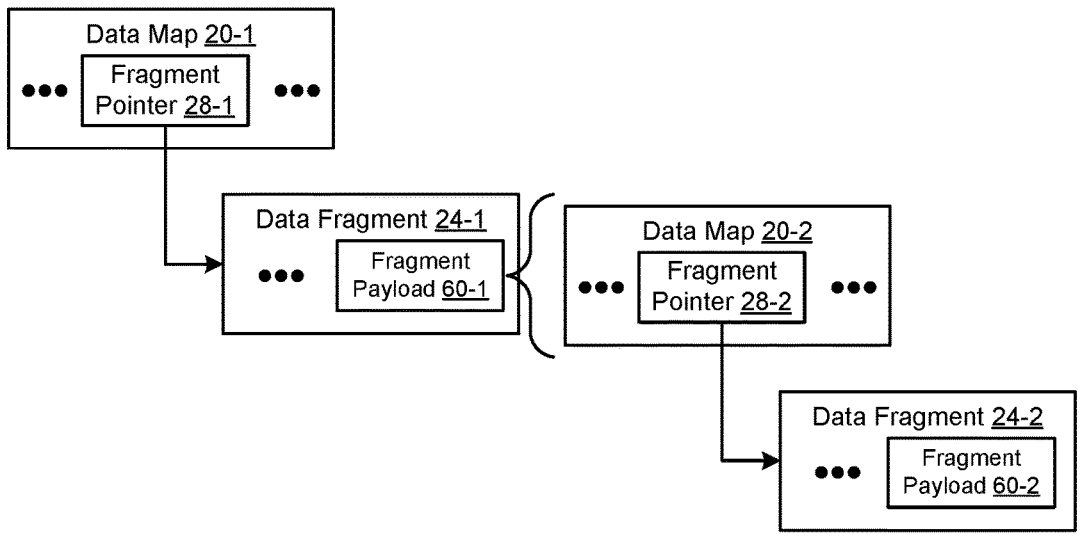
FIG. 9 is a schematic diagram depicting another embodiment of the distributed data architecture.

The distributed data architecture may provide a hierarchy of multiple layers of data maps. FIG. 9 depicts an embodiment of the distributed data architecture having a first data map 20-1 including a plurality of pointers 28-1 to a plurality of data fragments 24-1 (only one of which is shown in the figure). The plurality of fragments 24-1 are distributed to a plurality of different data storage locations as discussed above. The first map 20-1 may map at least one data element to the plurality of data fragments 24-1. However, in the depicted embodiment, the payload 60-1 of at least one of the data fragments 24-1 contains a second data map 20-2 instead of an actual fragment of the data element. The second data map 20-2 itself includes a plurality of pointers 28-2 to a plurality of second data fragments 24-2 (only one of which is shown in the figure). The plurality of second fragments 24-2 are again distributed to a plurality of different data storage locations as discussed above. The second map 20-2 may map the corresponding data fragment 24-1 into the plurality of further data fragments 24-2. The plurality of further fragments 24-2 include payloads 60-2 that contains actual data fragments of the first data fragment 24-1. Providing such a hierarchy of data maps 20 further improves the security of the distributed data architecture by increasing the number of layers of the distributed data architecture that must be traversed by a breach before actual data fragments are reached. Note that, although FIG. 9 shows two layer of data maps 20, other hierarchical embodiments may include any number of layers of data maps 20.

Figure 10A:
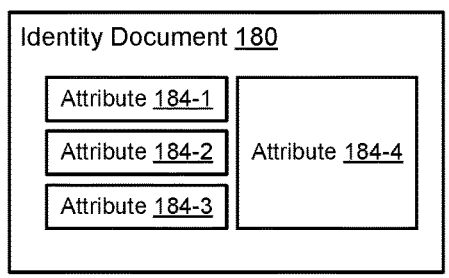
FIG. 10A is a schematic diagram depicting an embodiment of an identity document including data elements.
Figure 10B:
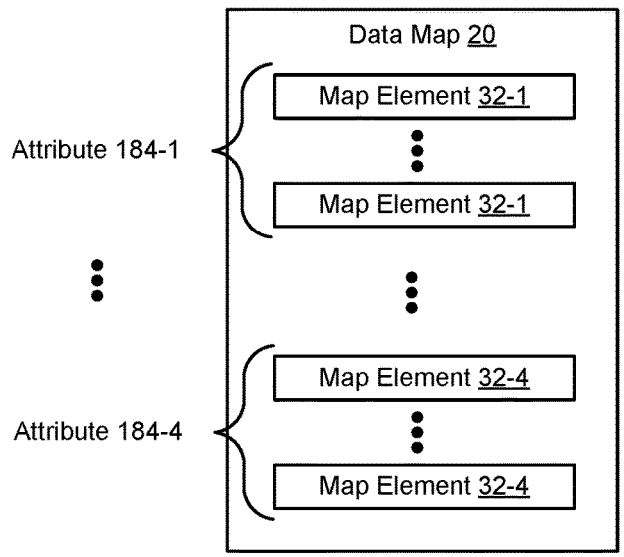
FIG. 10B is a schematic diagram depicting an embodiment of a representation of the identity document stored using the distributed data architecture.

The distributed data architecture may selectively map data elements of a data set in data maps 20 in various ways. For example, the distributed data architecture may map a related set of data elements into a single data map 20. FIG. 10A depicts an embodiment of an identity document 180 such as a driver's license, passport, etc. The identity document 180 has a number of data elements 184, such as a first attribute 184-1 including a name of a person identified by the identity document 180, a second attribute 184-2 including an identification number of the identity document 180, a third attribute 184-3 including a mailing address of the person, and a fourth attribute 184-4 including a picture of the person. FIG. 10B depicts an embodiment of a data map 20 mapping the data elements of the identity document 180. The data map 20 includes a first set of map elements 32-1 including a first set of pointers to map the first attribute to a plurality of first data fragments, a second set of map elements including a second set of pointers to map the second attribute to a plurality of second data fragments, a third set of map elements including a third set of pointers to map the third attribute to a plurality of third data fragments, and a fourth set of map elements 32-4 including a fourth set of pointers to map the fourth attribute to a plurality of fourth data fragments. Other embodiments may selectively map data sets in other ways. For example, in other embodiments, a related data set may be mapped to a plurality of data maps 20, such as mapping the data elements of the identity document 180 to a plurality of different data maps 20. In other embodiments, several data sets may be mapped to a single data map 20.

A hierarchical embodiment of the distributed data architecture may also be used to selectively map data elements of a data set. For example, the identity document 180 depicted in FIG. 10A may be mapped using a hierarchical embodiment of the distributed data architecture such as depicted in FIG. 9. In such embodiments, one or more of the map elements 32-1 . . . 32-4 depicted in FIG. 10B may instead point to data fragments 24 containing an additional data map 20 mapping the actual data fragments 24 or even further layers of data maps 20.

The distributed data architecture may be used to provide selective access to a data map 20 or copy of a data map 20 to enable various functions, such as recovery of a lost data map 20, providing legally authorized access to data for legal authorities, etc. FIG. 11 depicts an embodiment of a method of providing access to a data map of the distributed data architecture. The method may be performed by or involving components of the system of FIG. 4, such as by the data service system. The method begins at step 1102.

At step 1104, a data map 20 and corresponding data fragments 24 according to the distributed data architecture are generated and distributed. The data map 20 and corresponding data fragments 24 may be generated and distributed as discussed above, such as according to embodiments of the method of FIG. 6.

At step 1106, a copy of the data map 20 is encrypted using a multi-party encryption technique that requires multiple parties to participate in the encryption and any subsequent decryption, and the encrypted data map stored. The multi-party encryption technique may be based on, e.g., Shamir's Secret Sharing, etc. The multiple parties may take various forms, and may include an operator of the data service system 112, operators of the data storage systems 116, other entities, etc. The encrypted data map 20 may be stored by one or more of the data service system 112, one of the data storage systems 116, etc.

At step 1108, a request for the data map 20 is received. A request for access to the data map 20 may be received from various different entities. In one example, the user may lose the user device 104 and any data maps 20 stored on the user device 104, and may need to request to retrieve a copy of the data maps 20 for restoring them onto a new device in order to continue using them. In another example, the user may be the subject of a legal or regulatory proceeding or investigation, and a legal entity, such as a lawyer, law enforcement agency, court, or regulator may have a legal right to access to the data elements, even without authorization by the user. The request may be received by an entity facilitating providing the access to the copy of the data map 20, such as the data service system 112, the data storage system 116, etc.

At step 1110, it is determined whether consensus exists among the multiple parties involved in the encryption and needed to perform the decryption of the copy of the data map 20 as to whether to provide access to the data map 20 for the requesting entity. For example, if the user is requesting access to his or her own data map 20, the multiple parties may be satisfied by the user undergoing an authentication process, such as entering a password, etc. If a legal entity is requesting access to a user's data, such as without authorization by the user, the multiple parties may require the requesting entity to provide a legally sufficient authorization, such as a valid search warrant, etc. If it is determined at step 1110 that there is no consensus to provide access to the data map 20 in response to the request, such as if sufficient the authentication and/or legal authorization has not been provided, the method proceeds to step 1114, where the method ends. If it is determined at step 1110 that there is consensus to provide access in response to the request, such as if sufficient authentication and/or legal authorization has been provided, the method proceeds to step 1112.

At step 1112, the data map 20 is decrypted with input from the multiple parties according to the multi-party decryption scheme, and provided to the requesting entity. The decryption and providing may be performed by an entity facilitating providing the access to the copy of the data map 20, such as the data service system 112, the data storage system 116, etc., with the requisite input from the multiple parties.

In embodiments, a method of providing access to a data map of the distributed data architecture may include only any subset of, or an alternative ordering of, the features depicted in or discussed above in regard to FIG. 11.

The distributed data architecture may be refreshed when one or more data fragments 24 are found to be invalid. FIG. 12 depicts an embodiment of a method of refreshing the distributed data architecture. The method may be performed by or involving components of the system of FIG. 4, such as by the user device 104, data service system 112, data storage systems 116, etc. The method begins at step 1202.

At step 1204, it is determined that one or more data fragments 24 pointed to by one or more data maps 20 are invalid. The determination may be made based on to various factors, such as expiration, revoking, or corruption of the data fragments 24. For example, data fragments 24 of a data element of identity data may be deem to be invalid when an identity document, of which the data element is a part, expires, is revoked, etc. In another example, data fragments 24 may have been found to have suffered corruption of their integrity, such as due to a system failure, unauthorized access, etc. In embodiments, the determination may be performed by the data service system 112, such as either on its own or in response to information that it receives.

At step 1206, any data maps 20 pointing to fragments determined to be invalid are invalidated. The invalidation may be performed in various ways. For example, the data service system 112 may suspend functionality related to the invalidated data maps 20 in its system, delete such data maps 20, and/or communicate such suspension and/or deletion instructions to the user device 108.

At step 1208, one or more replacement data fragments 24 may be generated and distributed. The replacement data fragments 24 may cure the deficiencies of the invalid data fragments 24, such as no longer being a part of an expired, revoked or corrupt data set. The data service system 112 may generate the new data fragments 24 from a valid replacement data element that it receives. The data fragments 24 may be generated and distributed as discussed above, such as using embodiments of the method of FIG. 6.

At step 1210, replacement data maps 20 pointing to the replacement data fragment 24 may be generated and distributed. The replacement data maps 20 may be generated and distributed as discussed above, such as using embodiments of the method of FIG. 6.

In embodiments, a method of refreshing the distributed data architecture may include only any subset of, or an alternative ordering of, the features depicted in or discussed above in regard to FIG. 12.

Additional embodiments of the user device 104, transaction system 108, data service system 112, data storage systems 116, and associated methods, as discussed herein, are possible. For example, any feature of any of the embodiments of these systems and methods described herein may be used in any other embodiment of these systems and methods. Also, embodiments of these systems and methods may include only any subset of the components or features of these systems and methods discussed herein.

What is claimed is:

1. A method for conducting a transaction, the method comprising:
   receiving, at a user device from a transaction system, a request for a data element for conducting the transaction;
   in response to receiving the request, accessing by the user device a data map corresponding to the requested data element, the data map including a plurality of pointers for a plurality of data fragments of the data element, each of the data fragments containing a different portion of the data element, each of the pointers pointing to a respective different one of the plurality of data fragments located at a respective different one of a plurality of storage locations;
   decrypting, by the user device, the data map;
   retrieving, by the user device using the pointers of the data map, the plurality of data fragments from the plurality of different storage locations;
   assembling the requested data element using the retrieved plurality of data fragments; and
   providing, by the user device to the transaction system, the requested data element to conduct the transaction.

2. The method of claim 1, wherein the plurality of different storage locations include a plurality of different data storage systems.

3. The method of claim 1, further comprising:
   sending, by the user device to a data service system separate from the user device, a request for the data map; and
   receiving, by the user device from the identity service system, the data map.

4. The method of claim 1, wherein the data element includes identity data to enable identification of the user, the identity data including at least one of: a name of the user, an mailing address of the user, an email address of the user, a picture of the user, a driver's license number of the user, or a passport number of the user.

5. The method of claim 1, wherein the transaction includes at least one of: an identification of the user, or a security interrogation of the user.

6. The method of claim 1, wherein the data element includes financial data to enable identification of the user, the financial data including at least one account number.

7. The method of claim 1, wherein the transaction is at least one of: a purchase transaction, or a credit approval transaction.

8. The method of claim 1, wherein the user device is a mobile device, and the transaction system is an Internet system.

9. The method of claim 1, further comprising:
fragmenting the data element into the plurality of data fragments, each data fragment representing a different portion of the data element;
storing the plurality of data fragments at the plurality of different data storage locations so that each of the plurality of data fragments is stored on respective different one of the plurality of different data storage systems;
generating the data map including the plurality of pointers for the plurality of data fragments; and
storing the data map on a system separate from the plurality of data storage locations.

10. A method for conducting a transaction, the method comprising:
receiving, at a user device from a transaction system, a request for a data element for conducting the transaction;
in response to receiving the request, accessing by the user device a data map corresponding to the requested data element, the data map including a plurality of pointers for a plurality of data fragments of the data element, each of the data fragments containing a different portion of the data element, each of the pointers pointing to a respective different one of the plurality of data fragments located at a respective different one of a plurality of storage locations;
for each of the plurality of data fragments, determining from the data map a time-to-live (TTL) attribute, the TTL attribute indicating a time period for which the respective data fragment is valid;
determining whether the TTL attributes for the plurality of data fragments indicate that the plurality of data fragments are currently valid;
retrieving, by the user device using the pointers of the data map, the plurality of data fragments from the plurality of different storage locations;
assembling the requested data element using the retrieved plurality of data fragments;
providing, by the user device to the transaction system, the requested data element to conduct the transaction,
wherein the retrieving the plurality of data fragments, the assembling the requested data element, and the providing the requested data element are performed in response to determining that the TTL attributes for the plurality of data fragment indicate that the plurality of data fragments are still valid; and
in response to the TTL attributes for at least one of the plurality of data fragments indicating that the at least one data fragment is not valid, preventing retrieving of that data fragment.

11. The method of claim 10, further comprising decrypting, by the user device, the data map.

12. A method for processing a data map, the method comprising:
fragmenting a data element into a plurality of data fragments, each data fragment representing a different portion of the data element;
storing each of the plurality of data fragments at a respective different one of a plurality of different data storage locations;
generating a data map including a plurality of pointers, each of the pointers pointing for a respective one of the plurality of data fragments located at the respective one of the plurality of different data storage locations;
encrypting the data map; and
storing the encrypted data map on a device separate from the plurality of data storage locations.

13. The method of claim 12, wherein the plurality of different storage locations include a plurality of different data storage systems.

14. The method of claim 12, further comprising determining a distribution of the plurality of data fragments among the plurality of different data storage systems.

15. The method of claim 12, further comprising at least one of: encrypting the data element before the fragmenting, or encrypting the plurality of data fragments.

16. The method of claim 12, further comprising:
for each of the plurality of data fragments, assigning a time-to-live (TTL) attribute indicating a predetermined time period for which the data fragment is valid; and
adding the time-to-live attributes for the plurality of data fragments to the data map.

17. The method of claim 13, wherein the plurality of different data storage locations are located at a plurality of different physical locations.

18. The method of claim 12, further comprising:
receiving, at a user device from a transaction system, a request for the data element for conducting a transaction;
in response to receiving the request, determining the data map corresponding to the requested data element;
retrieving, using the data map, the plurality of data fragments of the data element from the plurality of different data storage locations;
assembling the data element from the retrieved plurality of data fragments; and
providing, by the user device, the data element to the transaction system to conduct the transaction.

19. The method of claim 12, wherein the storing the encrypted data map stores the encrypted data map on a user device.

20. A system for conducting a transaction, the system comprising:
a user device including:
at least one non-transitory machine readable storage medium having a data map and program instructions, the data map including a plurality of pointers, each of the plurality of pointers pointing to a respective different one of a plurality of different data storage locations storing a respective different one of a plurality of data fragments of a data element; and
at least one processor configured to execute the program instructions to perform a method of conducting a transaction, the method including:
receiving from a transaction system a request for the data element for conducting the transaction;
decrypting the data map;
in response to receiving the request, using the pointers of the data map to retrieve the plurality of data fragments of the data element from the plurality of different data storage locations;
assembling the data element from the retrieved plurality of data fragments; and providing the data element to the transaction system to conduct the transaction.

21. The system of claim 20, wherein the plurality of different storage locations include a plurality of different data storage systems.

22. The system of claim 20, wherein the method further includes:
- fragmenting the data element into the plurality of data fragments, each of the data fragments representing a different portion of the data element;
- storing each of the plurality of data fragments on the respective different one of the plurality of different data storage locations;
- generating the data map including the plurality of pointers for the plurality of data fragments; and
- storing the data map on a device separate from the plurality of data storage locations.

23. A system for conducting a transaction, the system comprising:
- at least one non-transitory machine readable storage medium having program instructions; and
- at least one processor configured to execute the program instructions to perform a method of processing a data map, the method including:
  - fragmenting a data element into a plurality of separate data fragments, each data fragment representing a different portion of the data element;
  - storing each of the plurality of data fragments on a respective different one of a plurality of different data storage locations;
  - generating a data map including a plurality of pointers, each of the pointers pointing to a respective one of the plurality of data fragments on the respective one of the plurality of different data storage locations;
  - encrypting the data map; and
  - storing the encrypted data map on a device separate from the plurality of data storage locations.

24. The system of claim 23, wherein the plurality of different storage locations include a plurality of different data storage systems.

25. The system of claim 23, wherein the method further includes:
- receiving from a transaction system a request for the data element for conducting a transaction;
- in response to receiving the request, using the data map to retrieve the plurality of data fragments of the data element from the plurality of different data storage locations;
- assembling the data element from the retrieved plurality of data fragments; and
- providing the data element to the transaction system to conduct the transaction.

* * * * *